Figure 6:
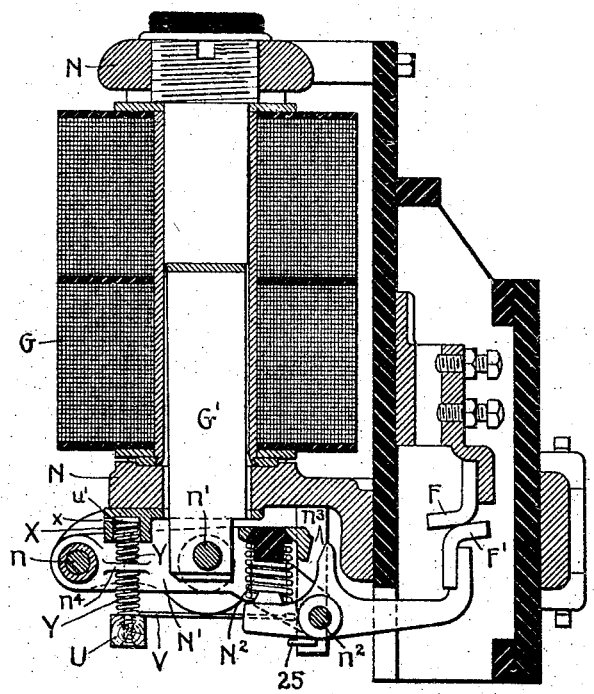

No. 794,991. PATENTED JULY 18, 1905.
J. B. LINN.
MOTOR CONTROL SYSTEM.
APPLICATION FILED NOV. 11, 1901.

Witnesses.
J. Ellis Glenn.
Benjamin B. Hull.

Inventor:
John B. Linn.
by Albert G. Davis
Atty.

No. 794,991. PATENTED JULY 18, 1905.
J. B. LINN.
MOTOR CONTROL SYSTEM.
APPLICATION FILED NOV. 11, 1901.
3 SHEETS—SHEET 2.
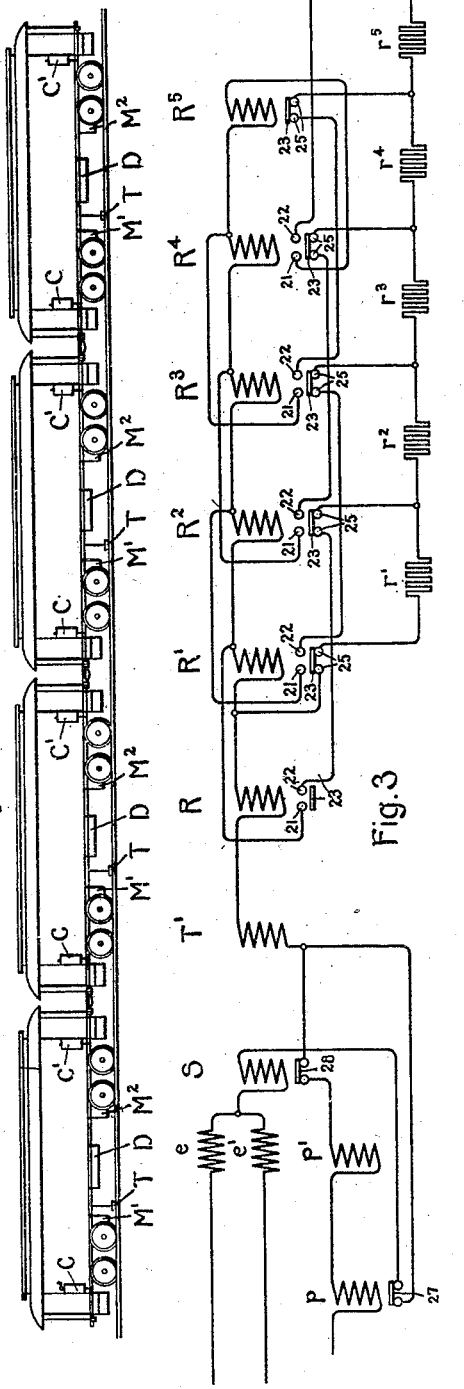
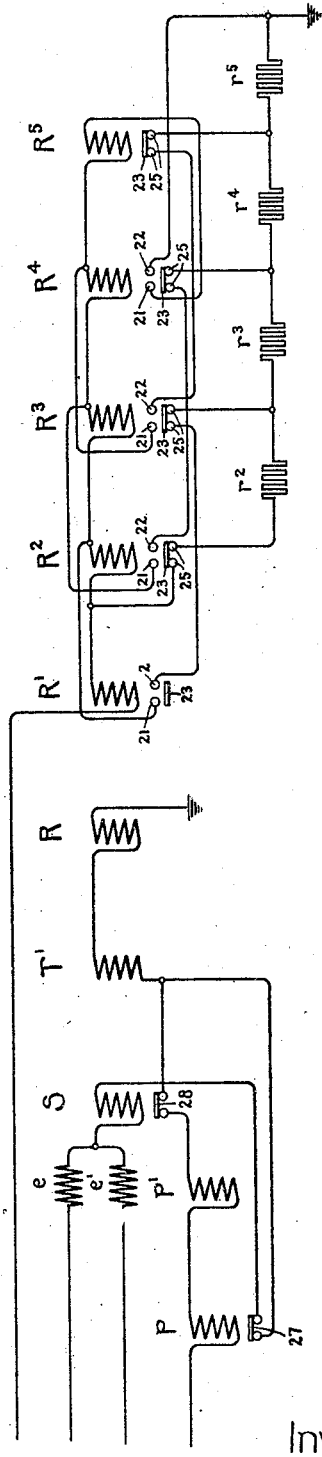
Witnesses.
J. Ellis Glenn.
Benjamin B. Hull
Inventor
John B. Linn.
by Albert G. Davis
Atty.

No. 794,991. PATENTED JULY 18, 1905.
J. B. LINN.
MOTOR CONTROL SYSTEM.
APPLICATION FILED NOV. 11, 1901.

3 SHEETS—SHEET 3.

Witnesses.
J. Ellis Glenn.
Benjamin B. Hull.

Inventor.
John B. Linn.
by Albert G. Davis
Atty.

No. 794,991.                                                                                      Patented July 18, 1905.

UNITED STATES PATENT OFFICE.

JOHN B. LINN, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 794,991, dated July 18, 1905.

Application filed November 11, 1901. Serial No. 81,842.

*To all whom it may concern:*

Be it known that I, JOHN B. LINN, a citizen of the United States, residing at Schenectady, county of Schenectady, State of New York, have invented certain new and useful Improvements in Motor-Control Systems, of which the following is a specification.

The present invention relates to a system of control employing a controller of the separately-actuated contact type in which the several controller-contacts are operated by means of circuit connections so arranged that the system will be automatic or at least partially automatic in its operation. In such a system the circuit connections between the master-controller and the actuating-winding of the controller-contacts are so arranged that a circuit may be completed from a suitable source of supply through the actuating-winding of one or a number of the controller-contacts, and means are provided whereby the operation of the said contact or contacts connects the actuating-winding of a succeeding contact to the control system, the latter contact also operating to connect the actuating-winding of still another contact to the control system, and so on, so that after the actuating-circuit at the master-controller has been closed certain of the controller-contacts will operate automatically in succession to perform a desired function, such as the cutting out of the resistance in the motor-circuit. In such a system means has also been provided for stopping the successive operation of the contacts whenever the current in the controlled circuit rises above a predetermined limit.

In a system of the character above described the several contacts that are successively actuated are liable to follow each other too rapidly if some means is not provided for retarding their operation; and my present invention has for one of its objects to provide an improved retarding means which will operate to retard the operation of each succeeding controller-contact without interfering with the free operation of each individual contact as soon as its actuating-circuit has been closed. The use of such retarding means will compel the operation of the several contacts at definite intervals, which may be adjusted once for all in any particular system.

My invention also comprises a novel organization of circuit connections for rendering a controller of the separately-actuated contact type automatic in its operation, besides certain other details, all of which will be fully set forth in the following description and specifically pointed out in the claims annexed thereto.

The novel retarding means which I have devised for preventing the successively-actuated contacts from following each other too rapidly may be applied to an automatic system of any desired character. The automatic operating system which I have shown herein and which constitutes one of the features of my present invention is based on the system disclosed in patent to C. D. Perry, No. 687,060, granted November 19, 1901. I also use a reversing-switch such as is shown in the patent to W. B. Potter, No. 617,601—that is to say, a cylinder provided with contact-segments and oscillated, by means of two electromagnets, to connect the motors for either direction of rotation. I control both sets of switches from one master-controller.

Figure 7:
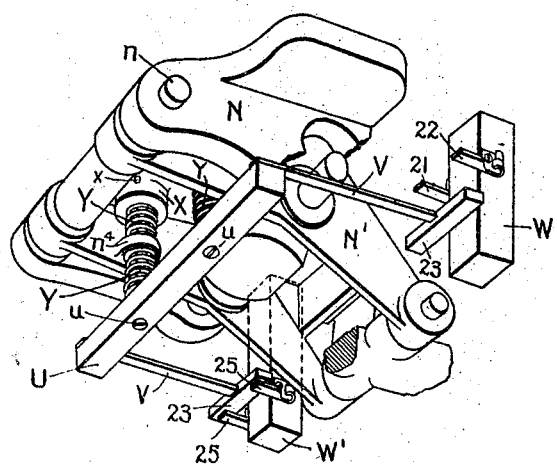
Figure 8:
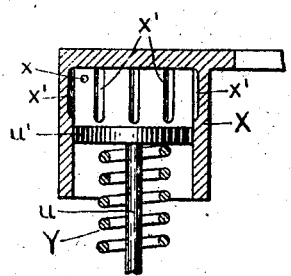

In the accompanying drawings, Figure 1 is a diagram of the control and power circuits of one motor-car of a train equipped with my improved system. Fig. 2 is a side elevation of a train of four motor-cars so equipped. Fig. 3 is a diagram of the circuit connections of the actuating-coils of the controller elements. Fig. 4 is a diagram of a modified arrangement of circuits. Fig. 5 is a diagram of a portion of the reversing-switch. Figs. 6 and 7 are views illustrating the application of my improved retarding device to one of the controller elements, and Fig. 8 is a section of the dash-pot of the retarding device on an enlarged scale.

Referring first to Fig. 1, $M'$ and $M^2$ indicate the motors constituting the motor equipment of an electrically-operated car, $A'$ $A^2$ being the armatures and $B'$ $B^2$ the field-magnets. At T is a trolley, such as a sliding contact-shoe, connected by a wire $t$ with two master-controllers, (represented diagrammatically at C C'.) At D is a controller comprising a plurality of electromagnetic switches for regulating the speed of the motors. The direction of rotation is governed by a reversing-switch E. Three wires 1 2 3 extend from one end of the car to the other, each wire being provided at its ends with suitable coupling devices by which it may be connected with a similar wire on the next adjacent car of the train. These wires are connected both to the actuating-circuits of the electromagnets which operate the motor-controller contacts and also to the master-controller contacts, so that by the operation of any master-controller on the train all the motor-controllers on the several motor-cars will be simultaneously operated. In Fig. 1 the wires which convey the trolley-current are shown by heavy lines, while the control-circuits are indicated by lighter lines.

The preferred construction for each of the elements of the controller D is shown in Figs. 5 and 6, from which it appears that each element comprises fixed and movable contacts F F' and a solenoid G for actuating the movable contact. These elements are diagrammatically indicated in Fig. 1, together with a blow-out coil H to extinguish any arc which may be formed at the contacts.

The order of circuit changes in the usual series-parallel motor-controller is well known, consisting in first connecting the motors in series through a current-reducing resistance, which is then gradually cut out, then placing the motors in parallel with each other and in series with the resistance, which is again gradually cut out until the motors are running in multiple under full-line current. The electromagnetic switches in my system therefore divide themselves into four sets, one (lettered T') serving as a main circuit-closer, another (lettered S) to connect the motors in series, two others (lettered P P') to connect them in multiple, and the fourth set (lettered R–R$^5$) to control the resistance in circuit with the motors. The switches in this last set operate in succession and automatically. To prevent them from following one another too rapidly, they are retarded by the time-limiting device hereinafter described.

Taking up now the operation of the system in detail, it will be observed at the outset that the master-controller has four fingers $t'$ 1' 2' 3', each connected, respectively, with the wires $t$ 1 2 3. The contact-segments shown in development are arranged in four positions, two for forward movement and two for reverse. Segments $t^a$ 1$^a$ are looped together and effect a connection of the motors in series for forward rotation. Segments $t^b$ 3$^b$ are looped together and effect a connection of the motors in parallel for forward rotation. Segments $t^c$ 2$^c$ are looped together and connect the motors in series for backward rotation. Segments $t^d$ 3$^d$ connect the motors in parallel for backward rotation. Suppose the master-controller to be moved to the first position FS, with the segments $t^a$ 1$^a$ in contact with their respective fingers. Current will then flow from the trolley T to finger $t'$, segments $t^a$ 1$^a$, finger 1', and wires 1 1$^2$ to a solenoid $e$, whose movable core is connected with a crank-arm E' on the shaft of the reversing-switch cylinder E. The circuit is completed through a finger 4', resting on a segment 4$^a$ on said cylinder, a connected segment 5$^a$, and a grounded finger 5'. The oscillation of the cylinder by the solenoid $e$ carries the segments 4$^a$ 5$^a$ away from the fingers 4' 5' and brings the former in contact with a segment 6$^a$, which is permanently in contact with a finger 6', connected by a wire 6 with the solenoid of the electromagnetic switch S. From this the circuit is by wires 7 and 8 to the switches T' and R and thence by wires 24 and 26 to the resistances $r'$ $r^2$ $r^3$ $r^4$ $r^5$ and ground. The switch T' closes the power-circuit and the switch R sends the current through the resistance R$^a$ to the wire 10, by which it is conducted to the fingers 10' 11', connected by segment 7$^a$ on the cylinder E of the reversing-switch. Finger 11' is connected by wire 11 with one brush of the motor M'. The other brush is connected by a wire 12 with a finger 12', in contact with a segment 8$^a$ on the cylinder E, by means of which the current is conveyed to a finger 13', connected by wire 13 with one terminal of the field-coil B' of the motor M'. The circuit is thence by wires 14 and 15 to the closed switch S, wire 16, finger 16', segment 9$^a$, finger 17', wire 17, armature A$^2$, wire 18, finger 18', segment 10$^a$, finger 19', wire 19, and field-coil B$^2$ to ground. It will be seen that the two motors are in series, with the resistance R$^a$ in the circuit.

The motor-circuits having been traced I will now return to the description of the control system and will explain how the speed-controlling contacts are caused to operate in succession and how the successive operation of the said contacts is automatically retarded without retarding or interfering with the free operation of the individual contacts. The actuating-windings of the electromagnetically-actuated switches or contacts R'–R$^5$ are connected in series in a circuit which leads directly to the master-controller, as shown in Fig. 4, or which includes the actuating-windings of the contacts which make the series and the parallel connections and the actuating-winding of the so-called "trolley-contact," as shown in Figs. 1 and 3. Intermediate circuit connections are led off from between each two adjacent windings of the switches R'–R$^5$, and each of these intermediate connections leads through a conductor 20 to one of two contacts 21 and 22, which are arranged to be bridged by a contact 23, operated by the armature of the next preceding switch in the series. The contacts 21, 22, and 23 are thus operatively related to the main contacts in the circuit to be controlled. Each contact 22 is connected through a compensating resistance to one side of the supply-circuit. This connection is shown direct to ground, though it might as well be and in practice often would be led back through contacts on the master-controller before reaching ground. Between the contact 22 and the ground connection a pair of auxiliary contacts 25 are preferably included in the circuit, these contacts being normally connected by a bridging-contact 23, controlled by one of the switches in advance of the one which is being operated, for a purpose which will be hereinafter explained. The conductor 24, leading from the contacts 22 on the next to the last contactor in the series $R^4$, is connected direct to ground. As already stated, each contact 22 is connected through a compensating resistance to ground, and these resistances are preferably graduated, so that the current in the actuating-circuit will be maintained substantially constant irrespective of the number of actuating-windings connected in circuit. In the arrangement which I have shown in the drawings all of these resistances $r'-r^5$ are connected in series in a single circuit and the conductors 26, leading from the contacts 25, are connected to the end and the intermediate points of this series of resistances. The first of the intermediate circuit connections 24 leads from between the actuating-windings of the switches R and R' and through the contacts 25 and the conductors 26 to the end of resistance $r'$, and this circuit therefore includes all of the resistance-sections $r'-r^5$. The second intermediate circuit includes another actuating-winding and leads to a point between the resistances $r'$ and $r^2$, and therefore includes only the resistances $r^2-r^5$, and each time the actuating-circuit is extended to include a new actuating-winding it is closed through a lesser number of the resistance-sections until when the circuit is closed through the entire series the compensating resistance is entirely out of the circuit.

The contacts 21, 22, and 25, together with the contacts actuated by the several switches and arranged to bridge the same, I have termed in some of the claims "circuit-controlling contacts," because they control the circuit connections of the actuating-windings of the switches $R'-R^5$. The contacts 21 and 22 operate to close the actuating-circuit through the actuating-winding of the next switch in advance in the series in shunt to a portion of the compensating resistance, and the contacts 25 operate to open the former actuating-circuit as soon as the actuating-circuit has been closed through the actuating-winding next in advance.

One form of time-limiting device by means of which the successive operation of the switch-contacts is retarded is indicated diagrammatically in Fig. 1; but in this form the time-limiting device affects as well the main switches or contacts as the auxiliary contact. It is preferable to so arrange the time-limiting device that the main switches may operate freely and independently thereof, and this preferred form is illustrated in Figs. 6, 7, and 8. The solenoid G is supported in a frame N, to which is pivoted at $n$ the switch-arm N', pivotally connected at $n'$ with the core G'. The switch-arm is made in two parts hinged together at $n^2$ and held in yielding relation to each other by a spring $N^2$. Stop-lugs $n^3$ limit the movement of the two parts. The effect of this construction is to give a quicker make and break at the contacts F F', as set forth in the application of F. E. Case, Serial No. 62,910, filed June 3, 1901. I add to this switch the auxiliary contact 23. (Shown in Fig. 1.) For the sake of symmetry of construction I have shown in Fig. 7 two bridging contacts 23, one normally closed upon the contacts 25 and the other ready to close upon the contacts 21 22. These contacts 23 are carried by a bar U, of insulation, to which are attached the arms V, on which the contacts are fastened. The contacts 21 22 are mounted on a support W and the contacts 25 on a similar support W'. The bar U is attached to the switch-arm N' by means of rods $u$, which pass through perforated lugs $n^4$ on the switch-arm. At its upper end each rod carries a piston $u'$, fitting in a dash-pot X, secured to the frame N and having a small vent $x$ at its inner end and one or more by-pass grooves or vents $x'$, which are opened by the piston when it passes beyond their outer ends. Helical springs Y are placed on each rod between the bar U and the lugs $n^4$ and also between said lugs and the pistons $u'$.

When no current is flowing, the system stands as shown in Fig. 1, the coil R being connected through the wire 24, contacts 25, and the resistance-coils $r'$ $r^5$ to ground. When the coil R is energized, its picks up its contact 23, closing the circuit through wires 20 24 26, thus cutting out the first resistance-coil $r'$ and permitting current to flow through switch-coil R'. This picks up its contacts 23, open-circuiting the wire 24 and establishing a circuit for the switch-coil $R^2$ through the contacts 21 22 at switch R' and the contacts 25 of the switch $R^3$, so as to cut out the resistance-coil $r^2$. In order to maintain the resistance of the control-circuit constant, the resistance of each coil $r'-r^5$ is equal to that of a coil $R'-R^5$, so that as successive switch-coils $R'-R^5$ are cut in the coils $r'-r^5$ are correspondingly cut out. This operation of cutting in successive coils $R'-R^5$ and cutting out the resistances $r'$ $r^5$ (and at the same time the power-circuit resistances $R^a-R^e$) would take place very rapidly if no means of checking it were supplied. The necessary retarding effect is produced by the dash-pots. When the switch-arm closes, it moves the pistons up in the dash-pots, and inasmuch as their progress is retarded by the slow predetermined escape of air from the vents *x* the upper springs Y are compressed and the bar U is held from moving with the switch-arm until the pistons pass the vents *x'*, when the air-pressure in the pots is suddenly relieved and the springs lift the bar suddenly. This effects a quick closing of the actuating-circuit at the contacts 21 22. It thus appears that the coils of the switches R' R⁵ will be successively energized at a rate determined by the speed of the pistons in the dash-pots. When the switch releases, the dash-pot piston moves instantly with the switch-arm, because the vents *x'* are open and permit air to enter freely above the piston during the first part of its stroke. Hence the circuit at the contacts 21 22 is promptly broken at all the switches, and the change from series to parallel cannot be effected until the dash-pots have permitted the bridging contacts 23 to come down on the contacts 25, this action being somewhat hastened by the lower springs Y. When the motors are to be connected in parallel, the master-controller is moved to the second position, (lettered FP,) sending current through the wires 3 3² and energizing the coils P P', the reversing-switch E remaining in the position to which it was moved when the solenoid *e* was first energized. It will be noticed that the switch P carries a bridging contact 27, which opens the circuit of the series switch S. Vice versa, the switch S controls the circuit of the parallel switch P by means of a bridging contact 28. This arrangement prevents the simultaneous operation of both switches. The switches P P' being closed and the switch S open, the trolley-current coming through the wire 10 divides at 29 and goes through the two motors M' M² in multiple, the ground connection for motor M' being closed by the switch P'. To stop the car, the master-controller is turned to the off position, deënergizing all the switches and opening the control and power circuits. If the car or train is to run in the opposite direction, the master-controller is turned to the RS position, energizing the solenoid *e'* and causing the reversing-switch E to oscillate to its other position, in which the fingers rest on a different set of contacts arranged to send the trolley-current in the reverse direction through the armatures A' A² in series. The circuits are otherwise the same. The RP position of the master-controller puts the motors in parallel for backward rotation.

The system heretofore described requires but three train-wires. If it is desired to divide the switch-actuating windings into two sets for the purpose of keeping down the resistance of the control-circuits, a four-wire system may be used, as diagrammed in Fig. 4. Here the reversing-switch, series and parallel switches, the trolley, and first-resistance switches are all in one set, while the remaining resistance-controlling switches are in another circuit with a separate train-wire, as clearly shown in the diagram.

What I claim as new, and desire to secure by Letters Patent of the United States, is—

1. In combination, a plurality of separately-actuated contacts operatively related to a circuit to be controlled, means for operating said contacts, and means for securing a certain time interval between the operation of the successive contacts without interfering with the free operation of the individual contacts.

2. A motor-controller of the separately-actuated-contact type, comprising speed-controlling contacts, means for operating said contacts, and time-limiting devices constructed and arranged to control the successive operation of said contacts without interfering with the free operation of the individual contacts.

3. A motor-controller of the separately-actuated-contact type, comprising speed-controlling contacts, means for closing said contacts in succession, and time-limiting devices constructed and arranged to regulate the successive closing of said contacts without interfering with the free operation of the individual contacts.

4. A motor-controller comprising a series of separately-actuated contacts, an actuating system therefor, means whereby the operation of each of certain contacts is controlled by a preceding contact in the series, and means for securing definite time intervals between the operation of the contacts without interfering with the free operation of the individual contacts.

5. In combination, a plurality of separately-actuated main contacts operatively related to a circuit to be controlled, actuating-windings for said contacts connected in series with intermediate circuit connections leading off between each two adjacent windings, a master-controller having its contacts arranged to close a circuit from a suitable source of supply through the first actuating-winding of the series and through the intermediate circuit connections leading from between the first two actuating-windings, and auxiliary contacts operatively related to said main contacts and arranged to close a circuit through the next intermediate connection as each main contact is operated.

6. In combination, a plurality of separately-actuated main contacts operatively related to a circuit to be controlled, actuating-windings for said contacts connected in series with intermediate circuit connections leading off between each two adjacent windings, a master-controller having its contacts arranged to close a circuit from a suitable source of supply through the first actuating-winding of the series and through the intermediate circuit connection leading from between the first two actuating-windings, auxiliary contacts operatively related to said main contacts and arranged to close a circuit through the next intermediate connection as each main contact is operated, and other auxiliary contacts arranged to open the circuit through each intermediate connection after the circuit through the next intermediate connection has been completed.

7. In combination, a plurality of separate electromagnetically-actuated switches having their actuating-windings connected in series, circuit connections intermediate the said windings, or certain of them, leading to one side of the supply-circuit, a connection from one end of the series of actuating-windings to a master-switch, and auxiliary contacts in the intermediate circuit connections controlled in their operation by the said switches.

8. In combination, a plurality of separate electromagnetically-actuated switches having their actuating-windings connected in series, circuit connections intermediate the said windings, or certain of them, leading to one side of the supply-circuit, a connection from one end of the series of actuating-windings to a master-switch, and auxiliary contacts in each of said intermediate circuit connections controlled in their operation by an earlier switch in the series.

9. In combination, a plurality of separate electromagnetically-actuated switches having their actuating-windings connected in series, circuit connections intermediate the said windings, or certain of them, leading to one side of the supply-circuit, a connection from one end of the series of actuating-windings to a master-switch, and auxiliary contacts actuated by each of said switches to close the actuating-circuit through the actuating-winding of the next switch in advance in the series.

10. In combination, a plurality of separate electromagnetically-actuated switches having their actuating-windings connected in series, circuit connections intermediate the said windings, or certain of them, leading to one side of the supply-circuit, a connection from one end of the series of actuating-windings leading to a master-switch having its contacts arranged to close a circuit from the source of supply through the actuating-winding of one of said switches, auxiliary contacts actuated by each of said switches to close the actuating-circuit through the actuating-winding of the next switch in advance in the series, and other auxiliary contacts actuated by each of said switches to open the actuating-circuit through the preceding intermediate connection.

11. In combination, a plurality of separate electromagnetically-actuated switches having their actuating-windings connected in series, circuit connections intermediate the said windings, or certain of them, leading to one side of the supply-circuit, compensating resistances included in said intermediate circuit connections, a connection from one end of the series of actuating-windings to a master-switch, and auxiliary contacts actuated by each of said switches to close the actuating-circuit through the actuating-winding of the next switch in advance in the series.

12. In combination, a plurality of separate electromagnetically-actuated switches having their actuating-windings connected in series, circuit connections intermediate the said windings, or certain of them, leading to one side of the supply-circuit, compensating resistances included in said intermediate circuit connections, a connection from one end of the series of actuating-windings leading to a master-switch having its contacts arranged to close a circuit from the source of supply through the actuating-winding of one of said switches, auxiliary contacts actuated by each of said switches to close the actuating-circuit through the actuating-winding of the next switch in advance in the series, and other auxiliary contacts actuated by each of said switches to open the actuating-circuit through the preceding intermediate connection.

13. In combination, a plurality of separate electromagnetically-actuated switches having their actuating-windings connected in series, circuit connections intermediate the said windings, or certain of them, leading to one side of the supply-circuit, a connection from one end of the series of actuating-windings to a master-switch, auxiliary contacts actuated by each of said switches to close the actuating-circuit through the actuating-winding of the next switch in advance in the series, and time-limiting devices for determining the rate of operation of the auxiliary contacts.

14. In combination, a plurality of separate electromagnetically-actuated switches having their actuating-windings connected in series, circuit connections intermediate the said windings, or certain of them, leading to one side of the supply-circuit, a connection from one end of the series of actuating-windings to a master-switch, auxiliary contacts actuated by each of said switches to close the actuating-circuit through the actuating-winding of the next switch in advance in the series, other auxiliary contacts actuated by each of said switches to open the actuating-circuit through the preceding intermediate connection, and time-limiting devices for determinating the rate of operation of the circuit-controlling contacts.

15. The combination with a motor-controller of the separately-actuated-contact type, of an actuating-circuit for each of certain contacts controlled by the adjacent contacts on each side.

16. The combination with a motor-controller of the separately-actuated-contact type, of an actuating-circuit for each of certain contacts controlled by the adjacent contacts, and a time-limiting device controlling the closing of the actuating-circuit.

17. The combination with a motor-controller of the separately-actuated-contact type, of an actuating-circuit for certain resistance-controlling contacts, controlled by the adjacent contacts on each side, and a pneumatic time-limiting device for each contact, controlling the closing of the actuating-circuit.

18. In combination, a plurality of separate electromagnetically-actuated switches, an actuating-circuit including the actuating-windings of one of said switches in series with a compensating resistance, and means whereby the said switch in operating completes the actuating-circuit through the actuating-winding of another of said switches in series with a lesser resistance.

19. In combination, a series of separate electromagnetically-actuated switches, means for closing an actuating-circuit through the actuating-winding of one of said switches in series with a compensating resistance, and means whereby each switch in operating completes the actuating-circuit through the actuating-winding of the next succeeding switch in the series.

20. In combination, a series of separate electromagnetically-actuated switches, means for closing an actuating-circuit through the actuating-winding of one of said switches in series with a compensating resistance, means whereby each switch in operating completes the actuating-circuit through the actuating-winding of the next succeeding switch in the series, and limiting devices for preventing a too rapid operation of the series of switches.

21. In combination, a series of separate electromagnetically-actuated switches, means for closing an actuating-circuit through the actuating-winding of one of said switches in series with a compensating resistance, and means whereby said switches in operating successively change the connections of the actuating-circuit so that it includes the actuating-windings of one after another of said switches in series with successively-decreasing resistances.

22. In combination, a series of separate electromagnetically-actuated switches having their windings connected in series, a circuit for supplying current to one or more of said windings, auxiliary contacts operatively related to each of certain switches normally closing the said circuit through the actuating-winding of a preceding switch in series with a compensating resistance, and other auxiliary contacts operatively related to each of the said switches for closing a circuit through the actuating-winding of an advance contact in shunt to a portion of said compensating resistance.

23. In an electromagnetic switch, the combination with a solenoid and its core, of a switch-arm pivoted to said core, an independently-movable contact actuated by said arm and a dash-pot connected to the contact so as to retard its movement without affecting the movement of the switch-arm.

24. In an electromagnetic switch, the combination with a solenoid and its core, of a switch-arm pivoted to said core, a bar of insulation, resilient arms secured to said bar, contacts carried on said arms, and yielding connections between said bar and the switch-arm.

25. In an electromagnetic switch, the combination with an electromagnet and its armature, of a switch-arm movable thereby, a dash-pot, a piston therefor actuated by the switch-arm, and an arm attached to said piston and carrying a contact.

26. In an electromagnetic switch, the combination with an electromagnet and its armature, of a switch-arm movable thereby, and having a lug, a dash-pot, a piston-rod for said dash-pot passing through said lug, a contact-arm secured to said rod, and springs on the rod on each side of said lug.

27. In an electrically-operated switch, the combination with a switch member, of an independent contact movable with said member, and a retarding device limiting the movement of said contact, without affecting the movement of the switch member.

28. In an electrically-operated switch, the combination with a switch member, of an independent contact movable with said member, and a retarding device limiting the movement of said contact relatively to said switch member.

In witness whereof I have hereunto set my hand this 8th day of November, 1901.

JOHN B. LINN.

Witnesses:
BENJAMIN B. HULL,
HELEN ORFORD.